United States Patent [19]

Jones et al.

[11] 4,001,073

[45] Jan. 4, 1977

[54] APPARATUS FOR PRODUCING INDIVIDUAL PHOTOGRAPHIC PRINTS WITH STRIP ADHESIVE BACKING

[76] Inventors: Herman L. Jones, 7302 84th St. NE., Marysville; John H. Haugen, 9925 Davies Road, Lake Stevens, both of Wash. 98270

[22] Filed: Sept. 12, 1974

[21] Appl. No.: 505,253

[52] U.S. Cl. ................................ 156/516; 156/554; 226/44; 242/75.3

[51] Int. Cl.$^2$ ...................... B32B 31/00; B31F 5/00

[58] Field of Search .......... 156/554, 555, 324, 516, 156/269, 510; 242/75.3, 75.5; 226/44; 428/40

[56] References Cited

UNITED STATES PATENTS

| | | | |
|---|---|---|---|
| 2,191,704 | 2/1940 | Bennett | 428/40 |
| 2,217,199 | 10/1940 | Emmey | 156/555 |
| 2,916,078 | 12/1959 | Hebert | 156/554 |
| 3,315,677 | 4/1967 | Tyrrell | 428/40 |
| 3,346,105 | 10/1967 | Nye et al. | 428/40 |
| 3,561,691 | 2/1971 | Nichols | 242/75.3 |
| 3,661,338 | 5/1972 | Becking | 242/75.5 |
| 3,722,822 | 3/1973 | Wallace | 242/75.5 |
| 3,756,896 | 9/1973 | Kono | 156/554 |
| 3,767,513 | 10/1973 | Gnage et al. | 156/516 |
| 3,857,527 | 12/1974 | Kranz | 242/75.5 |

*Primary Examiner*—Douglas J. Drummond
*Attorney, Agent, or Firm*—Dowrey & Cross

[57] ABSTRACT

A film cutter attachment includes one or more tape dispensing units, each of which dispenses automatically a continuous strip of pressure-sensitive adhesive transfer tape which is applied progressively to the back of a continuous strip of developed photographic film prints as the latter is drawn intermittantly into a conventional film cutter. Each tape strip is trained about a roller on the end of a pivotally movable arm which controls tension in the tape strip and causes additional tape to be dispensed. The film cutter cuts the print and tape strips after they are joined together adhesively into individual prints with adhesive transfer tape backing. The tape backing includes a cover ply which when peeled off leaves the strip adhesive adhered to the print and exposed for mounting the print.

29 Claims, 16 Drawing Figures

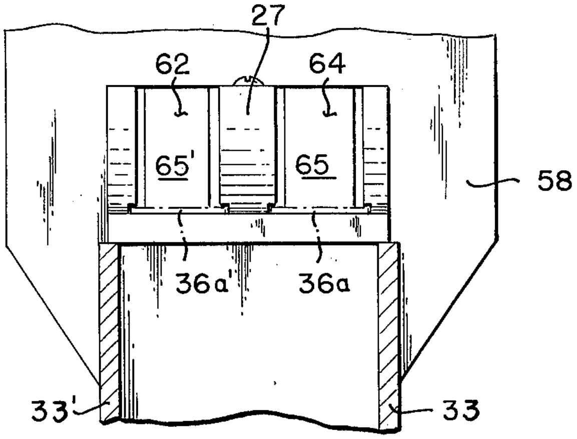
FIG. 3
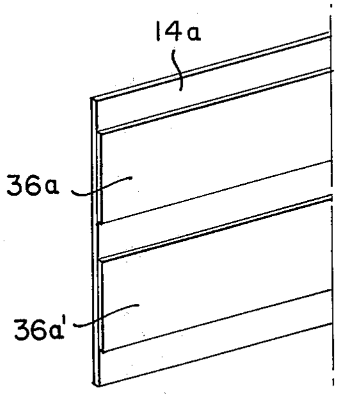
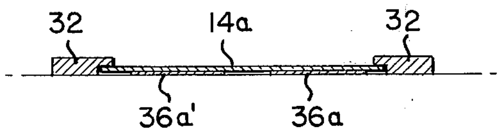
FIG. 4
FIG. 5
FIG. 6
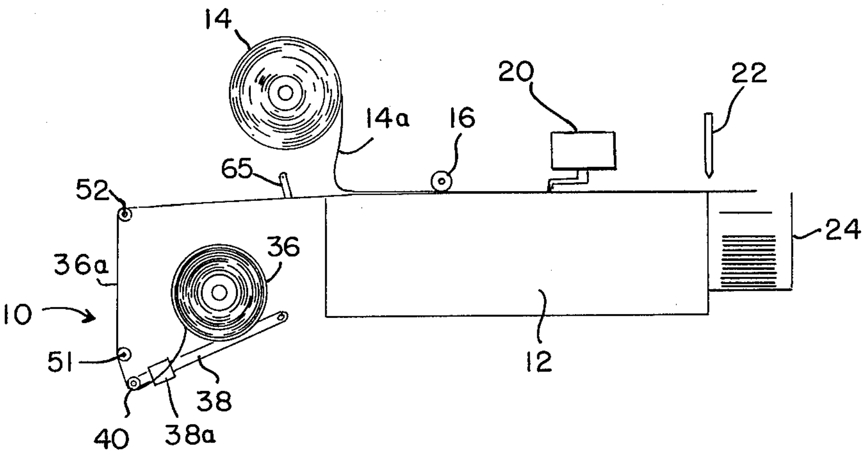

APPARATUS FOR PRODUCING INDIVIDUAL PHOTOGRAPHIC PRINTS WITH STRIP ADHESIVE BACKING

BACKGROUND OF THE INVENTION

Commercial photographic print developers have heretofore produced individual photographic prints by first developing and printing several customer's roll film on long continuous strips of photosensitive paper. These strips are then fed through a film cutter for cutting into individual prints. The continuous strips are usually provided with indexing holes, one for each print, such that the cutter can properly align each print prior to severance from the strip. The cutter also trims each print to remove the index hole. The developed print strip typically is wound into a roll from which it is drawn intermittantly into the film cutter by the cutter indexing device. In order to minimize the likelihood of improper indexing, the roll desirably is unwound by the cutter indexing mechanism so that little tension is applied to the print strip.

It has become desirable from the customer's point of view to be able to mount photographic prints without use of external aids such as corner tabs or the messiness of liquid cement. Until the present invention, however, commercial, mass production processing of roll film into prints has not permitted the commercial film developer to offer the customer a better means of mounting photographic prints.

SUMMARY OF THE INVENTION

The present invention enables the commercial film developer to automatically apply continuous strips of pressure-sensitive adhesive transfer tape to the back of a continuous strip of photographic prints which, upon severance into individual photographic prints, yield prints with a pressure-sensitive adhesive transfer tape backing. The tape includes a cover ply which when peeled off leaves strip adhesive adhered to the print and exposed for mounting. Thus, the customer may now mount photographic prints without any inconvenience. The present invention also permits the application of pressure-sensitive adhesive transfer tape during the photographic print strip cutting process without disrupting the proper indexing or cutting of the prints advanced through the cutter, and without causing curling of the individual severed prints.

BRIEF DESCRIPTION OF THE DRAWINGS

FIG. 3 is a cross section taken along the line 3—3 in FIG. 1;

FIG. 4 is a cross section taken along the line 4—4 in FIG. 1;

FIG. 5 is a perspective view of a portion of a strip of photographic prints depicting strips of adhesive transfer tape applied to the backside of the print strip;

FIG. 6 is a schematic depicting one aspect of the process of the invention.

DETAILED DESCRIPTION OF THE PREFERRED EMBODIMENT

Figure 1:
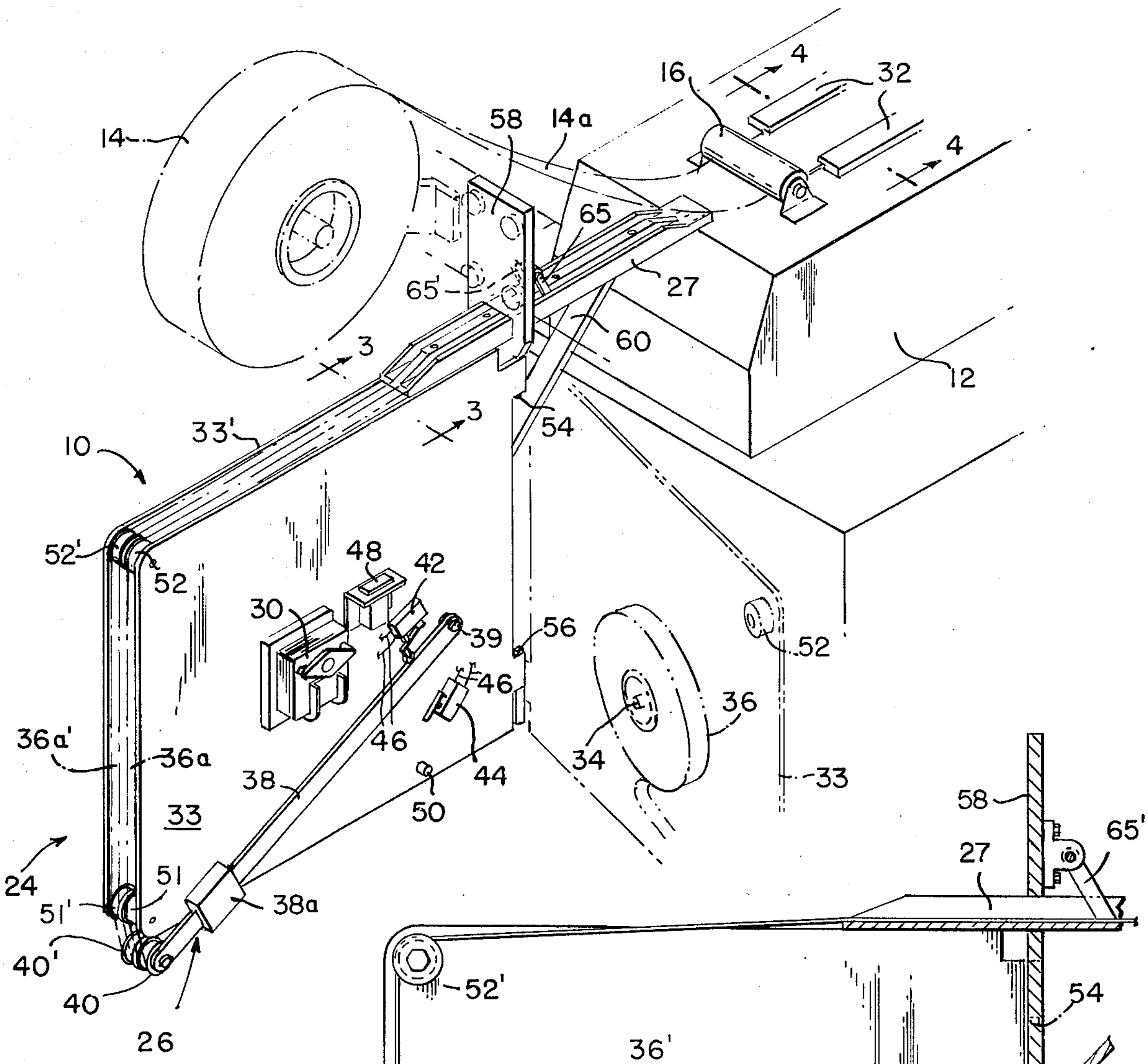
FIG. 1 is a perspective view of a film cutter attachment for applying strips of pressure-sensitive adhesive transfer tape to a continuous roll of photographic film prints.

The illustrated apparatus for dispensing a continuous strip of adhesive transfer tape and applying it to the back of a continuous strip of developed photographic prints is designed and constructed as an attachment to existing film cutters; however, it may be incorporated into a combination film cutting and tape applicator system depicted in FIG. 6. The film cutter attachment generally designated 10 is mounted upon the supply end of a film cutter 12. The film cutters with which this invention is particularly useful process a roll of developed photographic prints 14 on which several customer's roll film is printed. As depicted in FIG. 6, a continuous photographic print strip 14*a* is progressively unwound from the photographic print roll 14, drawn under a pressure roller 16 on the film cutter, and then advanced by an intermittantly operated indexing device 20 to a film cutter 22. The continuous photographic print strip 14*a* typically is provided with indexing holes (not shown), one for each print, in which the cutter indexing device 20 is engageable. The film cutter 22 severs each print from the photographic print strip 14*a* and trims each print to remove the index hole. The severed prints are collected in a receptacle 24 at the output end of the film cutter 12. Cutter units with which this invention may be used include those manufactured by Kodak Corporation and Pako Corporation.

Referring to FIG. 1, the film cutter attachment of this invention comprises two independently operable tape dispensing units 24 and 26, each mounting a roll of adhesive transfer tape, and a guide bar 27 for simultaneously positioning the tapes in mutually parallel registry with the back of the photographic print strip 14*a* as it is drawn into the film cutter 12. The number of tape dispensing units, of course, may be varied, if desired. As will also be appreciated, this invention may be used to apply one or more continuous tape strips to the back of a strip of developed photographic film prints as the latter is being wound into a roll. This roll thereafter is mounted in a film cutter and cut into individual prints.

Tape suitable for use in this invention is manufactured by Minnesota Mining and Manufacturing Company. It comprises a thin, silicone treated cover ply upon one side of which is deposited a layer of pressure-sensitive adhesive. Following pressure application of the tape to a substrate, such as the back of a strip of photographic paper, the cover ply can be peeled off leaving the adhesive adhered to the substrate and exposed.

The tapes of each dispensing unit are unwound in synchronism with the advancement of the print strip 14*a* during the cutting process and are applied progressively in mutually parallel relationship (see FIGS. 4 and 5) to the back of the photographic print strip 14*a* as it is unwound from the print roll 14 and drawn intermittantly underneath the cutter pressure roller 16 by the cutter indexing device 20. The print strip 14*a* with the adhesive tapes adhered thereto is then passed between two mutually opposed edge channels 32 along which it is advanced to the cutter 22 by the indexing device 20. The cutter simultaneously severs the individual prints and the respective portions of the adhesive tapes adhered thereto.

Figure 2:
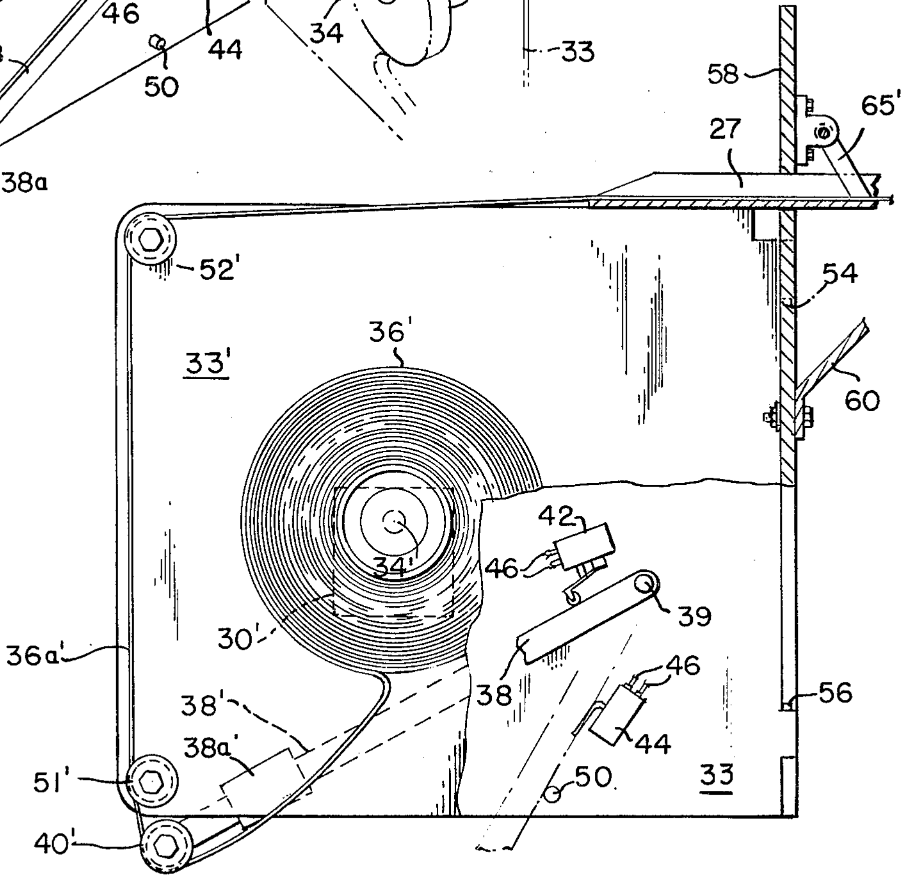
FIG. 2 is a side view, partially in section, of the FIG. 1 cutter attachment.

The tape dispensing units 24 and 26 are generally similar. The right tape dispensing unit 26 is described herein with reference numerals. Like parts of the left tape dispensing unit 24 are designated with the same reference numerals primed. As depicted in FIG. 1, a stepping motor 30 mounted on the outside surface of a vertical, generally square mounting plate 32 drives a horizontal output shaft 34 which extends through the mounting plate 33. A roll 36 of the above-described adhesive transfer tape is mounted on shaft 34 adjacent the inside surface of the mounting plate 33. An arm 38 weighted by a small weight 38*a* is pivotally supported by a horizontal pivot pin 39 projecting from the outside surface of the mounting plate 32, relative to which the arm can swing vertically, as depicted in FIG. 2. Upper and lower electrical limit switches 42 and 44 engage the arm 38 when it reaches its upper and lower limits of travel, depicted in solid and broken lines, respectively, in FIG. 2. These switches are connected by wires 46 to a junction connector 48 (FIG. 1) which is interconnected with the cutter and stepping motor electrical control systems. A stop peg 50 abuts against and supports the arm 38 when it swings to its lower position. Lower and upper rollers 51 and 52 project inwardly from the rear lower and upper corners of the mounting plate 32.

The mounting plates 33 and 33' each are pivotally interconnected by upper and lower vertical pivot pins 54 and 56 with a vertical adaptor plate 58 to swing horizontally between an open position, depicted in broken lines in FIG. 1, in which they avert from one another and a closed position in which they are adjacent and mutually oppose each other. In the mounting plate open position, the tape rolls 36 and 36' are exposed for reloading. It will be recognized that the construction of the adaptor plate 58 may vary depending upon the type of film cutter with which this invention is used.

As best shown in FIG. 1 the guide bar 27 forms a bridge between the upper edges of the dispensing units 24 and 26 and the supply end of the film cutter 12. The guide bar 27 extends through a square opening in the upper portion of the adaptor plate 58 to which it is secured by a brace 60.

As shown in FIGS. 1 and 2, the unwound strip portions 36*a* and 36*a'* of the tape rolls 36 and 36' are trained about the undersides of the arm rollers 40 and 40', lower rollers 51 and 51' and then over the upper rollers 52 and 52' with the abovedescribed cover ply on each tape facing and engaging its associated roller. Upon passing over the latter rollers, the tapes are oriented substantially in the plane of top surface of the film cutter 12 as they pass along the bottom of mutually parallel U-shaped channels 62 and 64 (FIG. 3) in the guide bar 27. As best shown in FIG. 3, the tapes are maintained in flattened, generally horizontal conditions and pass underneath inclined tape stops 65 as they travel along these channels, the lower portions of which provide mutually opposed portions adapted to receive the longitudinal edge portions of the tape. The inclined tape stops 65 (see also FIGS. 1 and 2) are pivotally supported from the adapter plate in order to slidably engage the upper surfaces of the tapes and prevent them from becoming disengaged from the dispensing unit rollers if they are disconnected or severed from the print strip 14*a* before passing into the film cutter 12. As the tapes emerge from the forward ends of the guide bar channels 62 and 64, they are positioned with their exposed adhesive sides opposed to and in substantially face to face registry with the back of the unwound print strip 14*a* as it is drawn to the cutter pressure roller 16.

After loading fresh tape rolls into the tape dispensing units 24 and 26, the operator trains the tape about the dispensing unit rollers and engages the tapes within the guide bar channels 62 and 64 with the end of each tape projecting from the forward end of the guide bar 27. The operator then manually applies pressure to the superimposed photographic print and tape portions to bring them into adhesive engagement with each other. Thereafter, the cutter pressure roller 16 applies pressure to adhesively join together the superimposed photographic print and tape portions as they are automatically advanced conjointly to the film cutter 22 by the cutter indexing device 20.

The dispensing unit arms 38 and 38' control the tension in the tape strips 36*a* and 36*a'* as they are dispensed and applied to the photographic print strip 14*a*. As the tapes are intermittantly drawn into the cutter conjointly with the photographic print strip 14*a*, the arms 38 and 38' swing up and down as the tape loops between the tape rolls 36 and 36' and their respective lower rollers 51 and 51' vary in length. When one or both arms reach their upper positions (FIG. 2), they engage and close their respectively associated upper limit switches 42 and 42'. These switches cause the tape dispensing stepping motors 30 and 30' to be energized to dispense additional tape until the lengths of the tape loops are increased sufficiently to allow the arms 38 and 38' to swing downwardly out of engagement with the upper limit switches 42 and 42'. When the tape supply is exhausted, the arms swing to their lower positions at which they engage and close the lower limit switches 44 and 44'. These switches, which are connected in the cutter electrical control circuit, cause the cutter to be turned off.

Thus it will be seen that the tape strips 36*a* and 36*a'* are tensioned by the dispensing unit arms 38 and 38' as necessary to guide the tapes during dispensing. These arms also cause additional amounts of tape to be dispensed automatically, substantially simultaneously and in synchronism with intermittant movement of the photographic print strip 14*a* so that the tape strips remain relatively slack as they are drawn to the film cutter by the cutter indexing device 20. Inasmuch as the cutter indexing device 20 does not have to pull additional tape from the tape rolls 36 and 36', erratic or jerky motion in the tape and photographic print strips is minimized as they are drawn together and advanced to the film cutter 22. This provides greater continuity of movement of the tape and photographic print strips, and hence ensures accurate print cutting by the film cutter 22. Curling of the severed prints is minimized or eliminated by selection of an arm weight sufficient to maintain engagement and alignment of the tapes as they are trained about the dispensing unit rollers during dispensing; but light enough not to stretch the tapes, or to impose excessive drag on the photographic print strip 14*a* as it is unwound from the print roll 14 and drawn under the cutter pressure roller 16.

While the preferred embodiment of the invention has been illustrated and described herein, it should be understood that variations will be apparent to one skilled in the art. For example, the film cutter attachment of this invention may be used with film cutters which do not include a pressure roller 16. In such applications the print and tape strips are drawn adequately together by the film cutter channels 32; however, for more positive engagement, the forward end of the guide bar 27 may be positioned in sliding engagement with the back of the print strip 14*a* so that the tape strips 36*a* and 36*a'* are brought into engagement with the back of the print strip 14*a* as it sweeps past the forward end of the guide bar 27. Accordingly, the invention is not to be limited to the specific embodiment illustrated.

What is claimed is:

1. Apparatus for dispensing a continuous strip of adhesive transfer tape composed of a transferable pressure sensitive adhesive layer and a releasable backing strip, for progressive application to the back of a continuous strip of photographic film prints as the latter is drawn intermittantly into a film cutter, the apparatus comprising: means for dispensing a strip of adhesive transfer tape from an adhesive transfer tape roll and for directing the tape strip into a course of travel aligned with the direction of travel to be taken by a film print strip as it enters a film cutter; guide means providing an elongated path in said course of travel along which the tape strip is confined and guided into superimposed registry with the back of the photographic print strip, so as to bring progressively the adhesive layer of the dispensed tape strip and the back of the photographic print strip into face to face engagement with each other as they are drawn conjointly into the film cutter.

2. The apparatus according to claim 1, wherein said dispensing means comprises a pivotally movable arm having a roller at one end about which the dispensed tape strip is trained, to swing said arm to and from a first position corresponding to intermittant movement of the dispensed tape strip as it is drawn into the film cutter, said dispensing means being responsive to said arm reaching said first position for dispensing sufficient additional tape from the adhesive transfer tape roll to maintain the dispensed tape strip under tension while preventing impairment of operation of the film cutter.

3. The apparatus according to claim 2 wherein said dispensing means includes an electrically powered stepping motor for dispensing the tape strip, and including electrical switch means engaged by said arm at said first position for causing said stepping motor to be energized to dispense the tape strip.

4. The apparatus according to claim 2, wherein said arm further is movable to and from a second position when the tape strip is exhausted, and including means responsive to said arm reaching said second position for terminating movement of the photographic print strip.

5. The apparatus according to claim 1, wherein said guide means comprises an elongated member having an opened ended channel providing said path adapted to receive the tape strip and to maintain it in a substantially flat configuration, said elongated member being so disposed that the tape strip emerges therefrom in substantially face to face registry with the back of the photographic print strip as the latter is drawn into the film cutter.

6. The apparatus according to claim 5, wherein said channel includes mutually opposed portions for overlying the longitudinal edge portions of an adhesive transfer tape, whereby the tape is retained within the elongated member.

7. In a film cutter including means for severing individual photographic film prints from a continuous strip of photographic film prints, indexing means for advancing intermittantly the photographic print strip to the severing means, and means for applying pressure to the photographic print strip, as it is advanced to the severing means, the improvement comprising:

dispensing means for dispensing a continuous strip of pressure sensitive adhesive transfer tape composed of a transferable pressure sensitive adhesive layer and a releasable backing strip from an adhesive transfer tape roll and for directing the tape strip into a course of travel aligned with the direction of travel to be taken by a film print strip as it is advanced toward the pressure applying means;

guide means providing an elongated path in said course of travel along which the tape strip is confined and guided into superimposed registry with the back of the photographic print strip, so as to bring progressively the adhesive layer of the dispensed tape strip and the back of the print strip into face to face adhesive engagement with each other as they are drawn together by the indexing means past the pressure applying means, whereby the dispensed tape strip is advanced conjointly with the photographic print strip to the severing means for severance into individual film prints with pressure sensitive adhesive tape backing.

8. The apparatus according to claim 2, wherein said dispensing means comprises a pivotally movable arm having a roller at one end about which the dispensed tape strip is trained, to swing said arm to and from a first position corresponding to intermittant movement of the dispensed tape strip as it is drawn into the film cutter, said dispensing means being responsive to said arm reaching said first position for dispensing sufficient additional tape from the adhesive transfer tape roll to maintain the dispensed tape strip under tension while preventing impairment of operation of the film cutter.

9. The apparatus according to claim 8 wherein said dispensing means includes an electrically powered stepping motor for dispensing the tape strip, and including electrical switch means engaged by said arm at said first position for causing said stepping motor to be energized to dispense the tape strip.

10. The apparatus according to claim 8, wherein said arm further is movable to and from a second position when the tape strip is exhausted, and including means responsive to said arm reaching said second position for deactuating the film cutter.

11. The apparatus according to claim 7, wherein said guide means comprises an elongated member having an opened ended channel providing said path adapted to receive the tape strip and to maintain it in a substantially flat configuration, said elongated member being so disposed that the tape strip emerges therefrom in substantially face to face registry with the back of the photographic print strip as the latter is drawn toward said pressure applying means.

12. The apparatus according to claim 11, wherein said channel includes mutually opposed portions for overlying the longitudinal edge portions of an adhesive transfer tape, whereby the tape is retained within the elongated member.

13. Tape dispensing apparatus suitable for use with a photographic film cutter, said apparatus comprising:

dispensing means for dispensing two strips of pressure sensitive adhesive transfer tape, each composed of a transferable pressure sensitive adhesive layer and a releasable backing strip, and for directing the tape strips into a course of travel aligned with the direction of travel to be taken by a strip of photographic film prints as the latter is drawn into a photographic film cutter; and guide means providing an elongated path in said course of travel along which the tape strips are confined and maintained parallel such that their adhesive layers and the back face of the print strip are progressively engaged in superimposed face to face relation as they are drawn conjointly into the film cutter.

14. The apparatus of claim 13, wherein said guide means includes two parallel elongated channels extending along said path and adapted to respectively receive the two tape strips, said channels each being of sufficient width to engage the edges of the respective tape strip.

15. Apparatus as defined in claim 14, wherein said guide means include means overlying the longitudinal edge portions of the two tape strips for retaining the two tape strips in their respective channels.

16. The apparatus of claim 14, wherein each channel includes a flat bottom surface and is of sufficient width to engage the edges of the respective tape strip such that its releasable backing strip is maintained substantially flat against said bottom surface.

17. The apparatus of claim 14, wherein said dispensing means further comprises means spaced from said channels along said course of travel for directing the tape strips toward said channels in a direction parallel to the lengths thereof.

18. The apparatus of claim 13, wherein said dispensing means further comprises means solely engaging said backing strips for directing the tape strips along said course of travel.

19. The apparatus of claim 13, wherein said dispensing means comprise two dispensing units for dispensing the two tape strips respectively, each unit including roll support means rotatably supporting a roll of pressure sensitive adhesive transfer tape such that the roll can be unwound to dispense one of the tape strips, means pivotally mounting at least one roll support means to swing between (1) a tape dispensing position in which the two rolls face one another for rotational movement about a common axis to thereby dispense the tape strips in parallel relation, and (2) a tape loading position in which the one roll averts from the other roll.

20. The apparatus of claim 13, wherein said dispensing means includes means for independently dispensing the two tape strips.

21. The apparatus of claim 20, wherein said dispensing means include means rotatably supporting two rolls of pressure sensitive adhesive transfer tape such that they can be unwound independently to dispense the two tape strips, and means for independently controlling rotational movement of the rolls, to thereby independently exert tensioning effort upon the dispensed tape strips.

22. The apparatus of claim 21, further comprising means for engaging the tape strips independently of the print strip at a location adjacent the terminus of said elongated path to thereby maintain tension upon the tape strip portions between said location and said dispensing means upon detachment of the tape strips from the print strip.

23. The apparatus of claim 13, wherein said dispensing means include means providing two supplies of pressure sensitive adhesive transfer tape respectively associated with the two tape strips, and means for deactuating the film cutter in response to exhaustion of at least one tape supply.

24. In a photographic print cutting system, means for advancing a strip of photographic film prints, means for progressively applying two spaced apart pressure sensitive adhesive tape strips, each composed of a transferable pressure sensitive adhesive layer and a releasable backing strip, to the back face of the advancing print strip parallel to the length thereof, and means for simultaneously severing individual prints and portions of the tape strips applied thereto from the print and tape strips, respectively, to thereby provide individual photographic prints having pressure sensitive transfer tape backing made up of parallel severed portions of the two tape strips, said tape application means including dispensing means for dispensing the two tape strips from respective adhesive transfer tape rolls and for directing the tape strips into a course of travel aligned with the path of advance the print strip, and guide means providing an elongated path in said course of travel along which the tape strips are confined and maintained parallel in a single plane such that their adhesive layers and the back face of the print strip are progressively engaged in superimposed face to face relation as they are drawn conjointly to the severing means.

25. The system of claim 24, wherein said tape application means include means for independently dispensing the two tape strips.

26. The system of claim 24, wherein said tape application means include means for independently dispensing and tensioning the tape strips.

27. The system of claim 24, wherein said tape application means include means for rotationally mounting two adhesive transfer tape rolls respectively providing the two tape strips, and means for controlling operation of said print strip advancing means such that advancement of the print strip is terminated in response to exhaustion of at least one tape roll.

28. Tape dispensing apparatus, comprising: dispensing means for dispensing a strip of pressure sensitive adhesive transfer tape composed of a transferable pressure sensitive adhesive layer and a releasable backing strip, and for directing the tape strip into a course of travel aligned with the direction of travel of a moving strip of photographic film prints;

guide means providing an elongated path in said course of travel along which the tape strip is confined and guided such that its adhesive layer and the back face of the print strip are progressively engaged in superimposed face to face relation.

29. The apparatus of claim 28, wherein said dispensing means are further operative for dispensing two strips of such pressure sensitive adhesive transfer tape and for directing them into said course of travel, and wherein said guide means are further operative for providing said elongated path in said course of travel along which the tape strips are confined and maintained parallel such that their adhesive layers and the back face of the print strip are progressively engaged in superimposed face to face relation.

* * * * *

UNITED STATES PATENT AND TRADEMARK OFFICE

CERTIFICATE OF CORRECTION

PATENT NO. : 4,001,073

DATED : January 4, 1977

INVENTOR(S) : Herman L. Jones and John H. Haugen

It is certified that error appears in the above-identified patent and that said Letters Patent are hereby corrected as shown below:

Column 3, lines 4 and 11, "32", each occurrence, should read -- 33 --.

Signed and Sealed this

*Fourth* Day of *October 1977*

[SEAL]

*Attest:*

RUTH C. MASON
*Attesting Officer*

LUTRELLE F. PARKER
*Acting Commissioner of Patents and Trademarks*